United States Patent [19]

Polak

[11] 4,070,927

[45] Jan. 31, 1978

[54] PLANETARY GEARING ARRANGEMENT FOR A TRANSMISSION

[75] Inventor: James C. Polak, Indianapolis, Ind.

[73] Assignee: General Motors Corporation, Detroit, Mich.

[21] Appl. No.: 692,970

[22] Filed: June 4, 1976

[51] Int. Cl.² .................................... F16H 57/10
[52] U.S. Cl. ............................................. 74/765
[58] Field of Search .............. 74/753, 759, 764, 765, 74/768, 770

[56] References Cited

U.S. PATENT DOCUMENTS

| 3,946,623 | 3/1976 | Murakami et al. | 74/765 |
| 3,956,946 | 5/1976 | Murakami et al. | 74/770 X |
| 3,971,268 | 7/1976 | Murakami et al. | 74/770 X |
| 3,987,690 | 10/1976 | Murakami et al. | 74/759 |

Primary Examiner—Benjamin W. Wyche
Assistant Examiner—Lance W. Chandler
Attorney, Agent, or Firm—Donald F. Scherer

[57] ABSTRACT

A planetary gearing arrangement having a plurality of interconnected planetary gear sets controlled by friction drive establishing devices such as clutches and brakes for selectively establishing a plurality of forward drive ratios and a reverse drive ratio. The number of forward drive ratios available is one greater than the number of friction drive establishing devices. Each ratio change between the forward drives is accomplished by a single transition interchange of the friction drive establishing devices.

3 Claims, 3 Drawing Figures

PLANETARY GEARING ARRANGEMENT FOR A TRANSMISSION

This invention relates to planetary gear arrangements and more particularly to multi-speed planetary gear arrangements having single transition shifting between drive ratios.

It is an object of this invention to provide an improved multi-speed planetary gearing arrangement wherein a plurality of simple planetary gear sets and friction drive establishing devices are combined to provide a plurality of forward speed ratios being one greater in number than the number of friction devices and wherein the interchange of successive forward ratios is accomplished by single transition shifting.

Another object of this invention is to provide an improved planetary gearing arrangement for use in a transmission wherein the gear arrangement has at least three planetary gear sets which are operatively interconnected between the input and output members and are also interconnected with five friction devices including two clutches, two brakes and one other friction drive establishing device, all of which are selectively operable to provide six forward speed ratios with single transition shifting therebetween.

A further object of this invention is to provide an improved planetary gearing arrangement having an input shaft and an output shaft and a plurality of simple planetary gear sets disposed therebetween, and wherein each gear set has an input member, an output member and a reaction member with a first of the gear set having its output connected to the output shaft and its input selectively connected to the input shaft by a clutch, a second of the gear sets having its output connected to the first gear set and its input selectively connectable through a clutch to the input shaft, and a third of the gear sets having its output connected to the second gear set, and wherein a brake is provided for each reaction member of the first and second gear set and wherein the clutches, brakes and friction device may be controlled to establish a plurality of forward drive ratios one greater in number than the clutches, brakes and friction device and wherein interchange between successive ratio is accomplished by simple transition shifting.

These and other objects and advantages of the present invention will be more apparent from the following description and drawings in which.

Figure 1:
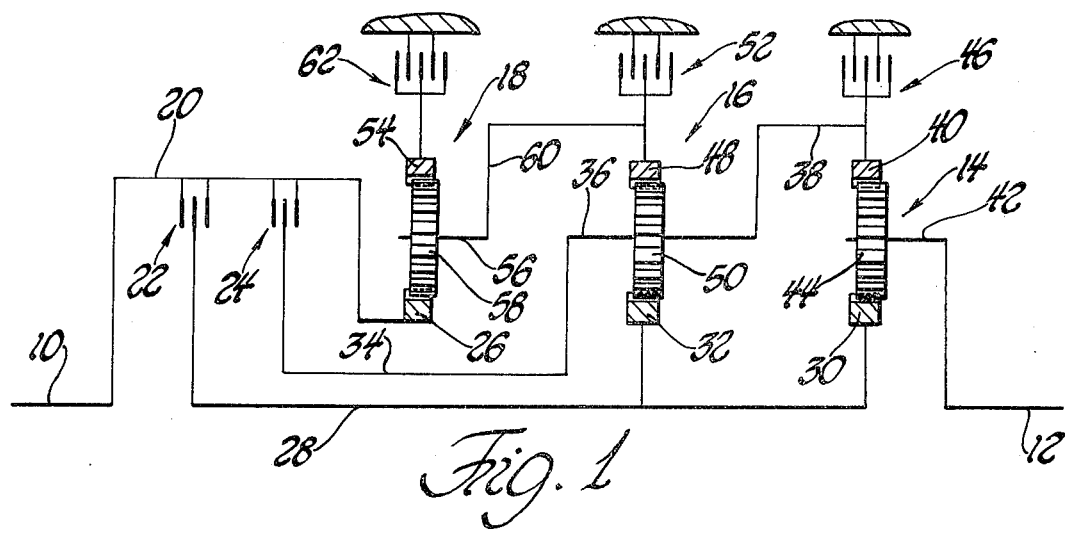
FIG. 1 is a schematic representation of a planetary gearing arrangement embodying the present invention.

Referring to the drawings wherein like characters represent the same or corresponding parts there is seen in FIG. 1 a planetary gearing arrangement having an input shaft 10, an output shaft 12 and three planetary gear sets 14, 16 and 18 disposed therebetween. The input shaft 10 is drivingly connected to a clutch drum 20 which drum 20 provides input drives for clutches 22 and 24. The clutch drum 20 is also drivingly connected to a gear 26 which is a component of the planetary gear set 18. The input shaft 10 is preferably driven by a conventional torque converter, not shown, which torque converter is driven by an engine in a well known manner.

The input clutch 22 is connected to a shaft 28 which in turn is connected to sun gears 30 and 32 which are components of planetary gear arrangements 14 and 16 respectively. The input clutch 24 is connected to a shaft 34 which is connected to a planet carrier 36 which is a component of the planetary gear set 16 and which carrier 36 is connected through a hub 38 to a ring gear 40 which is a component of planetary gear set 14.

The planetary gear set 14 also includes a planet carrier 42 on which is rotatably mounted a plurality of pinion gears 44, only one of which is shown, meshing with the sun gear 30 and the ring gear 40. The ring gear 40 is operatively connected with a friction brake 46 which may be selectively engaged to restrain rotation of the ring gear 40 and the carrier 36. The carrier 42 is drivingly connected to the output shaft 12.

The planetary gear set 16 also includes a ring gear 48 and a plurality of pinion gears 50, which pinion gears 50 are rotatably mounted on carrier 36 and mesh with sun gear 32 and ring gear 48. The ring gear 48 is operatively connected to a friction brake 52 which may be selectively engaged to restrain rotation of the ring gear 48.

The planetary gear set 18 includes a ring gear 54, a planet carrier 56 and a plurality of pinion gears 58 which are rotatably mounted on carrier 56 and mesh with sun gear 26 and ring gear 54. The carrier 56 is drivingly connected to a hub 60 which is connected to the ring gear 48. The ring gear 54 is operatively connected to a friction brake 62 which may be selectively engaged through restrain rotation of ring gear 54.

The clutches 22 and 24 and the brakes 46, 52 and 62 are preferably of the multiple disc type fluid actuated friction drive establishing device which are commonly used in planetary gear transmissions. The construction, operation, and control of these devices is well known to those familiar with the art of power transmission such that a detailed description of these units is not considered necessary.

The gearing arrangements shown in FIG. 1 can be controlled by the clutches and brakes to provide six forward drive ratios and one reverse drive ratio. The terms forward and reverse of course refer to vehicle operation and indicate that the output shaft 12 will rotate in the same direction as input shaft 10 for the six forward drive ratios and in the opposite direction for the reverse drive ratio. The first and lowest speed ratio is established by the engagement of clutch 22 and brake 46. This establishes ring gear 40 as a reaction member in planetary set 14 and sun gear 30 as the input member of planetary set 14. The output of the planetary set 14 during this drive ratio is carrier 42 which is driven in the same direction as input shaft 10 but at a reduced speed.

The second forward drive ratio is established by the disengagement of brake 46 and the substantially simultaneous engagement of brake 52. This releases ring gear 40 of planetary gear set 14 while restraining rotation of ring gear 48 of planetary set 16. This establishes ring gear 48 as a reaction member. Since sun gear 32 is driven forwardly by the input shaft 10 through clutch 22, the carrier 38 and therefore ring gear 40 will be driven forwardly at a reduced speed. Thus ring gear 40 becomes an input member for planetary set 14. Since sun gear 30, ring gear 40 are driven forwardly, the carrier 42 will be driven forwardly at a more rapid speed than was available for a given input speed in the first gear ratio.

The third forward drive ratio is established by disengagement of brake 52 and substantially simultaneous engagement of brake 62. This action releases ring gear 48 while restraining rotation of ring gear 54. Since the sun gear 26 is driven in the forward direction and ring gear 54 is a reaction member, the carrier 56 and therefore ring gear 48 will be driven forwardly at a reduced ratio. Thus both sun gear 32 and ring gear 48 are input members such that the carrier 36 will be driven forwardly at a more rapid speed than was available in the second speed ratio. This increase in the speed of carrier 36 is also operative on ring gear 40 such that carrier 42 and therefore output shaft 12 are rotated at a higher speed than was available, for a given input speed, in the second gear ratio.

To establish the fourth forward speed ratio the brake 62 is disengaged while the clutch 24 is substantially simultaneously engaged. With both clutches 22 and 24 engaged the planetary gear sets 14 and 16 will be locked up and therefore the carrier 42 will rotate at a speed equal to the speed of input shaft 10.

To establish the fifth forward drive ratio, the clutch 22 is disengaged while the brake 62 is substantially simultaneously engaged. This establishes ring gear 54 as a reaction member and frees sun gears 30 and 32 from the input shaft 10. The carrier 56 of planetary set 18 is driven forwardly at a reduced speed which of course causes ring gear 48 of the planetary ring gear 16 to rotate forwardly at a reduced speed. The carrier 36 of planetary gear set 16 is driven forwardly at the same speed as the input shaft 10 as is the ring gear 40 of planetary gear set 14. The sun gears 32 and 30 are overdriven in a forward direction resulting in an overdrive ratio being attained at carrier 42 and therefore output shaft 12.

The sixth forward drive ratio is established by disengagement of brake 62 and substantially simultaneously engagement of brake 52. This establishes ring gear 48 as a reaction member in planetary gear set 16 such that sun gears 32 and 30 are overdriven at a more rapid speed than was attained in the fifth speed ratio for a given input speed. This of course results in a higher overdrive at carrier 42 and therefore output shaft 12.

To establish the reverse drive ratio, brake 62 and brake 46 are engaged while the remaining clutches and brakes are disengaged. Since brake 62 is engaged the ring gear 54 is a reaction member such that when sun gear 26 is driven forwardly by the input shaft 10, the carrier 56 and therefore ring gear 48 will be driven forwardly at a reduced ratio. Since brake 46 is engaged the carrier 36 and ring gear 40 are both reaction members such that sun gear 32 will be driven in a direction opposite to the input shaft 10 as is the sun gear 30. Since the sun gear 30 is driven oppositely to the input shaft 10 and since ring gear 40 is a reaction member, the carrier 42 will be driven in a direction opposite to the input shaft 10 as will the output shaft 12.

It is apparent from the foregoing description of the forward drive ratios that each ratio requires the engagement of different combinations of two of the five friction drive establishing devices. It is also apparent from the foregoing description that the interchange between successive forward ratios is accomplished by the disengagement of one of the drive establishing devices and the substantially simultaneous engagement of another drive establishing device. This is termed a single transition shift. There is no occurrence upon shifting between successive drive ratios where both of the controlling friction drive establishing devices are disengaged so that the establishment of two new controlling devices can be attained. This later condition is normally termed a double transition shift and usually results in the changing of gear ratios in two or more gear sets simultaneously.

Double transition shifting is difficult from a control standpoint, since the proper overlap of this type of friction device interchange is very difficult to attain. This is generally an undesirable feature in a power shifting type transmission. It can also be noted from the above description that the use of only five friction drive establishing devices permits the establishment of six forward speed ratios. Thus the number of speed ratios in the forward direction is one greater than the number of friction drive establishing devices contained in the transmission.

Figure 2:
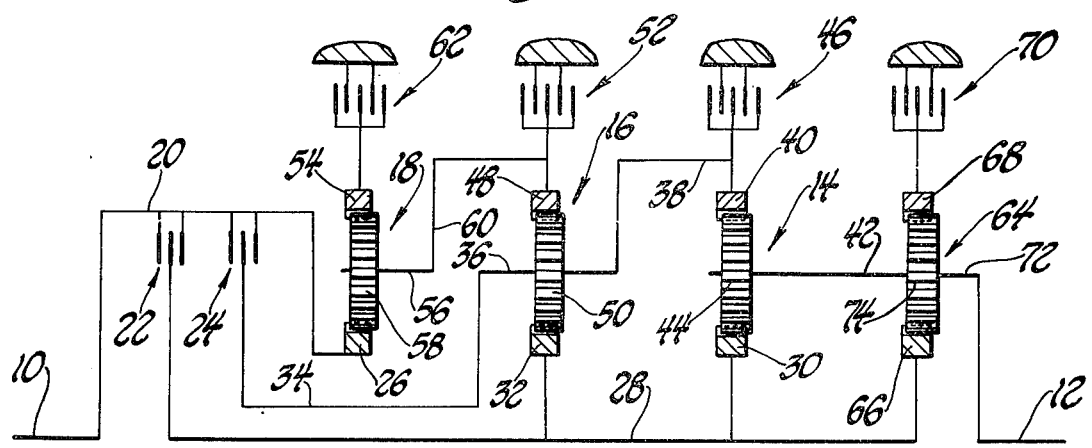
FIG. 2 is a schematic representation of another embodiment of the invention.

FIG. 2 is substantially the same as FIG. 1 with the addition of a planetary gear set designated 64. This planetary gear set includes a sun gear 66 which is connected to the shaft 28, a ring gear 68 which is operatively connected with a selectively operable friction brake 70, a carrier 72 which is connected to the carrier 42 and output shaft 12, and a plurality of pinion gears 74 which are rotatably mounted on the carrier 72 and mesh with the sun gear 66 and ring gear 68. The planetary gear sets 14, 16 and 18 and clutches 22 and 24 and brakes 46, 52 and 62 cooperate to provide six forward speeds as described for FIG. 1. The planetary gear set 64 is operable to provide a seventh forward speed. To establish a forward speed ratio in planetary gear set 64 the brake 70 is engaged and clutch 22 is engaged. This establishes a reduction drive ratio through planetary gear set 64 from the input shaft 10 to the output shaft 12. The gear ratio obtainable by planetary gear set 64 is most adapted to be useful as a gear ratio between the first and second ratios defined above for FIG. 1. Thus in the planetary gearing arrangement shown in FIG. 2, the first four forward speed ratios would be established by the following engagement and disengagement schedule of the clutches and brakes. First drive ratio is established by clutch 22 and brake 46, the second forward drive ratio is established by the interchange of the brakes 46 and 70, the third forward drive ratio is established between interchange of brakes 70 and 52, and the fourth forward drive ratio is established between interchange of brakes 52 and 62. The fifth, sixth and seventh gear ratios are established the same as those described above for FIG. 1. It is readily apparent that the advantages of the FIG. 1 transmission are found in the transmission shown in FIG. 2.

Figure 3:
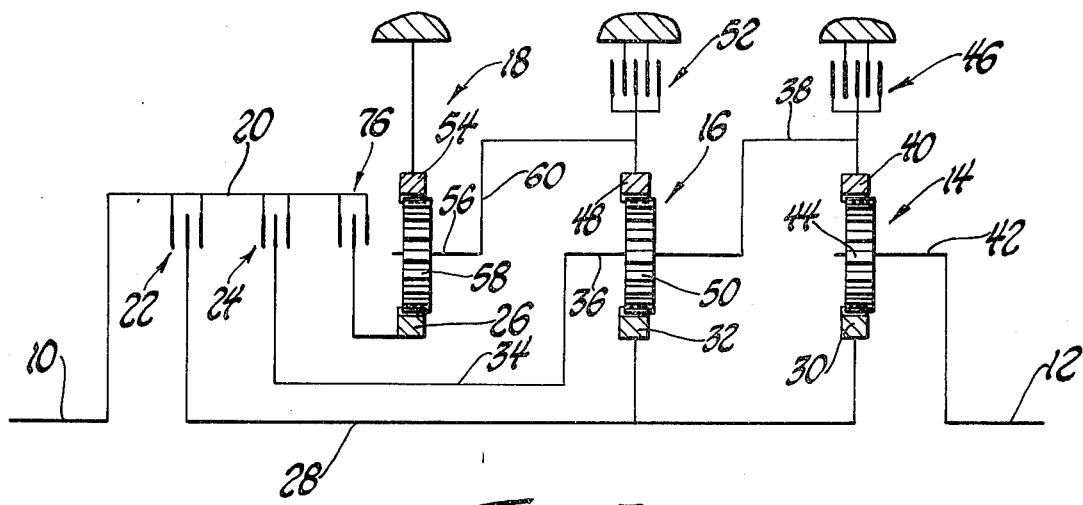
FIG. 3 is a schematic representation of a further embodiment of the present invention.

The transmission shown in FIG. 3 is also substantially identical with the transmission shown in FIG. 1 except that brake 62 has been replaced by a clutch 76 which is positioned between the input clutch hub 20 and sun gear 26. It should also be noted that ring gear 54 is permanently grounded to the transmission housing. The drive ratios associated with FIG. 3 are obtained in substantially the same manner as those described above for FIG. 1 with the exception that clutch 76 is engaged to establish the third and fifth forward drive ratios and the reverse drive ratio. The transmission arrangement shown in FIG. 1 is preferable to that shown in FIG. 3 since the average slip speeds between the friction plates of brake 62, when disengaged, are less than the slip speeds between the clutch 76 when disengaged, for the various speed ratios. From the foregoing description of FIGS. 1, 2 and 3 it should be obvious to those skilled in the art that the additional planetary gear set shown in FIG. 2 can also be combined with the planetary gearing arrangement shown in FIG. 3 to provide seven forward speeds.

Obviously, many modifications and variations are possible in light of the above teaching. It is, therefore, to be understood that within the scope of the appended claims the invention may be practiced otherwise than is specifically described.

What is claimed is:

1. A planetary transmission comprising; a transmission housing; input means; output means; a plurality of simple planetary gear means each having three members interconnected between said input means and said output means; a plurality of selectively operable friction drive establishing means including at least two clutch means for providing selective drive paths from said input means to said planetary gear means and said friction drive establishing means being further connected with said planetary gear means for establishing a plurality of forward drive ratios and a reverse drive ratio between said input means and said output means, the number of said forward drive ratios being one greater than the number of friction drive establishing means and said friction drive establishing means being interchanged during shifting from one ratio to the next higher or lower ratio with only a single transition interchange between said friction drive establishing means; and one of said planetary gear means (18) having the first member (sun gear 26, FIG. 1, ring gear 54, FIG. 3) thereof continuously connected to one of said transmission housing and said input means and the second member (ring gear 54, FIG. 1, sun gear 26, FIG. 3) of said one planetary gear means being selectively connectable with the other of said transmission housing and said input means through one of said friction drive establishing means (brake 62, FIG. 1, clutch 76, FIG. 3).

2. A planetary transmission having a stationary housing wherein a plurality of forward drive ratios and a reverse drive ratio are established by selective engagement of friction drive establishing means which cooperate with planetary gearing and wherein the total number of friction drive establishing means is one less than the number of forward drive ratios, said transmission comprising; input means; output means; a plurality of simple planetary gear means disposed between said input means and said output means with each of the planetary gear means having three members; two of said planetary gear means having the first members thereof interconnected and second members thereof interconnected and one of said two planetary gear means having the third member connected to said output means; first selectively engageable friction drive establishing means operatively connected between the first members of said two planetary gear means and said input means; second selectively engageable friction drive establishing means operatively connected to the second members of said two planetary gear means for selectively preventing rotation thereof; third selectively engageable friction drive establishing means operatively connected between second members of said two planetary gear means and said input means; fourth selectively engageable friction drive establishing means operatively connected to the third member of the other of said two planetary gear means for selectively preventing rotation thereof; fifth selectively engageable friction drive establishing means; another planetary gear means disposed between said input means and said two planetary gear means; the first member of said other planetary gear means being connected to the third member of the other of said two planetary gear means, the second member (sun gear 26, FIG. 1, ring gear 54, FIG. 3) of said other planetary gear means (18) being continuously connected to one of said input means and said transmission housing, the third member (ring gear 54, FIG. 1, sun gear 26, FIG. 3) being selectively connectable with the others of said transmission housing and said input means through said fifth selectively engageable friction drive establishing means (brake 62, FIG. 1, clutch 76, FIG. 3); and means including said fifth selectively engageable friction drive establishing means said input means and said transmission housing for providing a reduction drive ratio between said input means and the first member of said other planetary gear means; whereby said five friction drive establishing means are selectively engageable in combinations of two to establish six forward drive ratios and one reverse drive ratio between said input means and said output means, and the upshift to or downshift from successive forward drive ratios being accomplished by a single transition interchange of the friction drive establishing means.

3. A multi-speed planetary transmission comprising; input means; output means; a first planetary gear set having a sun gear, a carrier drivingly connected to said output means, a ring gear and a plurality of pinion gears rotatably mounted on said carrier and meshing with said sun gear and ring gear; a second planetary gear set having a sun gear connected to the sun gear of said first planetary gear set, a carrier connected with the ring gear of said first planetary gear set, a ring gear and a plurality of pinion gears meshing with said sun gear and ring gear and being rotatably mounted on the carrier; a third planetary gear set having a sun gear drivingly connected with said input means, a carrier connected with the ring gear of said second planetary gear set, a ring gear and a plurality of pinion gears meshing with said sun gear and ring gear and being rotatably mounted on said carrier; first selectively engageable friction clutch means for selectively connecting the sun gears of said first and second planetary gear sets with said input means; second selectively engageable friction clutch means for selectively connecting the carrier of said second planetary gear set and the ring gear of said first planetary gear set with said input means; first selectively operable friction brake means for preventing rotation of the ring gear of said first planetary gear set and cooperating with said first clutch means to establish a first drive ratio in said transmission; second selectively operable friction brake means for preventing rotation of the ring gear of said second planetary gear set and cooperating with said first clutch means to establish a second drive ratio in said transmission; third selectively operable friction brake means for preventing rotation of the ring gear of said third planetary gear set and cooperating with said first clutch means to establish a third drive ratio in said transmission; said first and second clutch means cooperating to establish a fourth drive ratio in said transmission; said second clutch means and said third brake means cooperating to establish a fifth drive ratio in said transmission; said second clutch means and said second brake means cooperating to establish a sixth drive ratio in said transmission and; said first brake means and said third brake means cooperating to establish a reverse drive ratio in said transmission.

* * * * *